United States Patent [19]

D'Agostino et al.

[11] 4,414,090

[45] Nov. 8, 1983

[54] SEPARATOR MEMBRANES FOR REDOX-TYPE ELECTROCHEMICAL CELLS

[75] Inventors: Vincent F. D'Agostino, Huntington; Joseph Y. Lee, Lake Grove, both of N.Y.

[73] Assignee: RAI Research Corporation, Hauppauge, N.Y.

[21] Appl. No.: 307,588

[22] Filed: Oct. 1, 1981

[51] Int. Cl.³ .................. C25B 9/00; C25B 13/08; H01M 14/00; H01M 2/16
[52] U.S. Cl. ............................ 204/252; 204/196; 429/5; 429/254
[58] Field of Search ............ 204/296, 252; 429/12, 429/27, 255, 249, 105-109, 245, 254, 5, 14, 17

[56] References Cited

U.S. PATENT DOCUMENTS

| | | | |
|---|---|---|---|
| 3,427,206 | 2/1969 | Scardaville et al. | 429/254 |
| 3,540,933 | 11/1970 | Boeke | 429/105 X |
| 3,585,081 | 6/1971 | Mirman | 429/254 X |
| 3,935,086 | 1/1976 | Misumi et al. | 204/296 X |
| 4,018,971 | 4/1977 | Sheibley et al. | 429/105 |
| 4,025,401 | 5/1977 | Fujwara et al. | 204/296 X |
| 4,053,684 | 10/1977 | Zitto et al. | 429/15 |
| 4,069,371 | 1/1978 | Zitto | 429/21 |
| 4,192,910 | 3/1980 | Frosch et al. | 429/105 X |
| 4,230,549 | 10/1980 | D'Agostino et al. | 204/159.17 |
| 4,234,623 | 11/1980 | Moshtev et al. | 429/249 X |
| 4,283,442 | 8/1981 | Machi et al. | 429/249 X |
| 4,295,952 | 10/1981 | de Nora et al. | 204/252 |
| 4,370,392 | 1/1983 | Savinell et al. | 429/105 X |

OTHER PUBLICATIONS

NASA–Redox Storage System Project, Industrial Briefing, Jul. 8–9, 1980, Redox Project Office, NASA Lewis Res. Center, Cleveland, Ohio.

*Primary Examiner*—Donald R. Valentine

[57] ABSTRACT

This disclosure is directed to improved redox type electrochemical cells, preferably those of the iron (+3)/iron (+2) electrolyte variety, incorporating polymeric, ion-exchange separator membranes produced by radiation grafting techniques.

11 Claims, 5 Drawing Figures

GRAFTING PROCESS

1. INITIATION

2. PROPAGATION

3. TERMINATION

PERCENT GRAFT VS. ELECTROLYTIC RESISTANCE IN 1M FeCl₃/2M HCl

△ PP
○ HDPE
□ LDPE

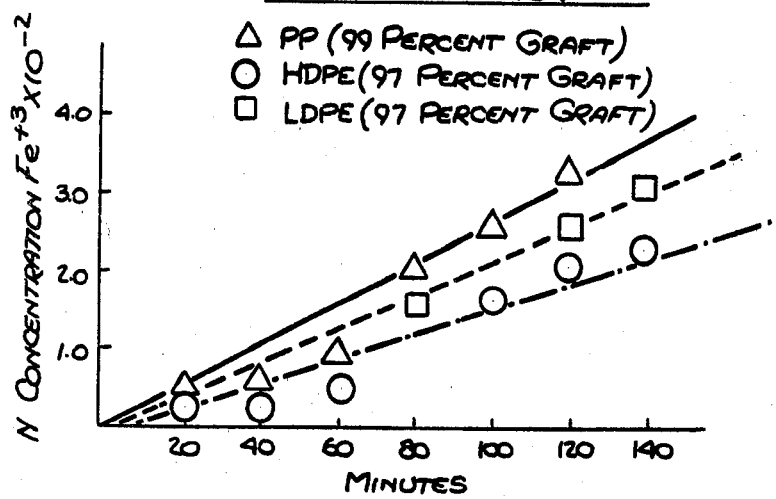
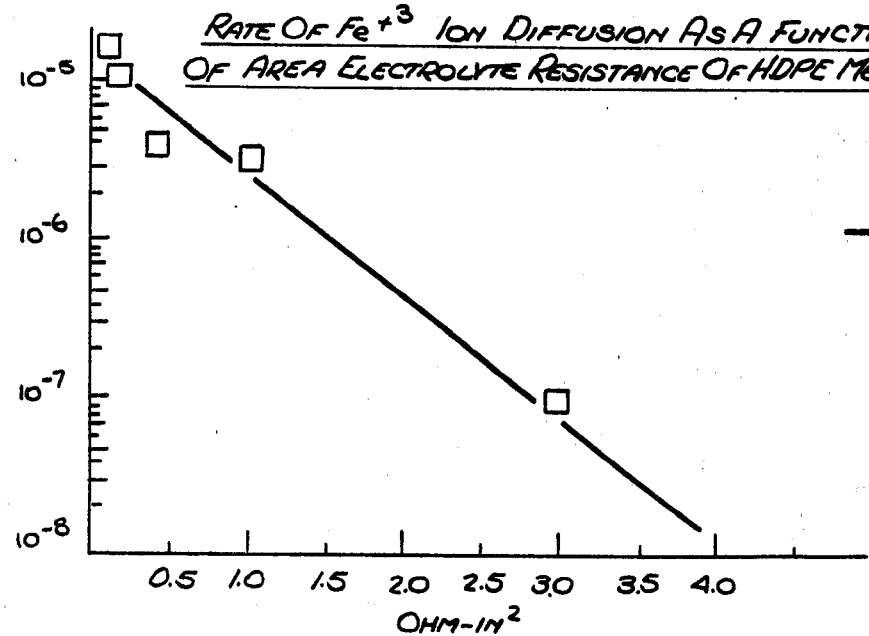
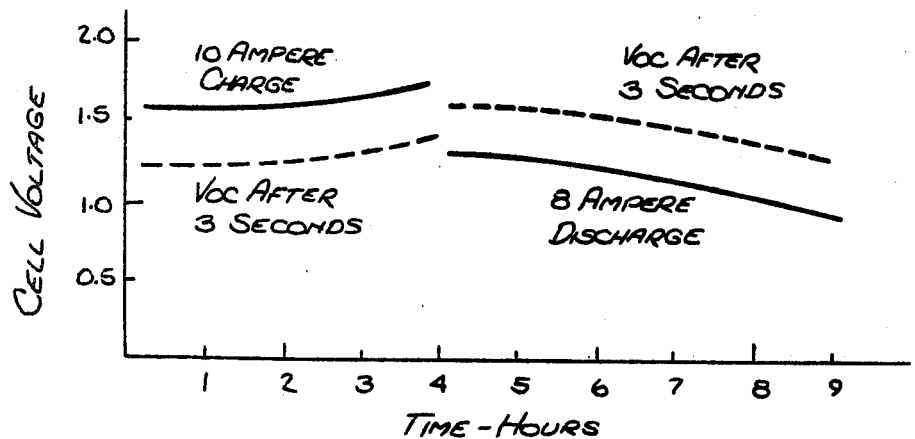

SEPARATOR MEMBRANES FOR REDOX-TYPE ELECTROCHEMICAL CELLS

BACKGROUND OF THE INVENTION

Basically, an electrochemical cell, or battery, is made up of two half-cells, each comprising an electronic conducting phase, or electrode, in contact with a second phase called an electrolyte, in which ionic conduction takes place. During discharge the electrolyte loses electrons to one of the electrodes thereby reducing that electrode. At the other electrode the electrolyte gains electrons, thereby oxidizing that electrode. The electrolyte associated with the positive electrode is referred to as the posilyte and the electrolyte associated with the negative electrode is referred to as the negalyte. In some cells the posilyte and negalyte are different solutions and therefore require a separator membrane to prevent the two solutions from physically mixing. In other types of cells the posilyte and the negalyte are the same, in which case the separator functions to physically separate the electrodes. These membranes should not, however, prevent ionic conduction between the posilyte and the negalyte.

Basic electrochemical cells may be classified as primary or secondary. Examples of primary battery systems are those having electrodes made of the active metal pairs mercury-zinc, silver-zinc, lead-zinc, copper-zinc, copper-magnesium, and silver-magnesium. Primary cells are generally not rechargeable. Examples of the most common secondary battery systems are those having electrodes made of the active metal pairs nickel-cadmium, silver-zinc and silver-cadmium. Secondary cells are rechargeable electrically by passing a current through the cell in a direction reversed from that of discharge. A common electrolyte used in both the primary and secondary cells is a 30 to 45% solution of potassium hydroxide.

In contrast to the above primary or secondary batteries, which employ pairs of active-metal electrodes held within the cell, the active material in the redox-battery is stored outside of the cell, in the form of pairs of solutions, or electrolytes. Storing the active material in this manner gives the battery a long shelf-life, and the capacity of the battery can be increased by increasing the amount of electrolyte. The heart of the system is the reactor cell where reduction and oxidation of the active species in the electrolyte occurs. The basic cell consists of two inert electrodes, which are commonly formed of carbon, separated by a separator membrane. On discharge, chemical energy is converted into electrical energy when the two reactive electrolytes are pumped through the cell compartments. During the charging stage, electrical energy is converted back to chemical energy and again, the two electrolytes are pumped through the cell compartments. Many such cells can be arranged into a stack to form a battery.

Redox batteries containing a variety of electrolyte pairs have been developed and are designated by the metal ions of the salts dissolved to form the posilyte and negalyte pairs. Some examples are iron $(+3)$/iron$(+2)$ (U.S. Pat. No. 4,069,371; U.S. Pat. No. 4,053,684), zinc $(+2)$/iron$(+2)$, chromium $(+3)$/iron$(+3)$, titanium $(+3)$/iron$(+2)$, titanium $(+3)$/bromine $(-1)$, and zinc $(+2)$/bromine$(-1)$.

Physically, the separator membranes prevent the reactive fluids from mixing and causing internal shorting-out of the battery. More specifically, the separator must allow the current-carrying ions to pass freely between compartments, while restricting other ions from passing which can cause self-discharge.

Micro-porous separators, which are characterized by relatively large-size pores in the membrane (0.01 to 0.1 microns), have been used in redox cells. The ion exchange separators disclosed herein exhibit a higher coulombic efficiency and an easier control of the hydraulic flow through the stacked cells (battery) in the redox system.

It is an object of this invention to provide an improved redox-type electrochemical cell incorporating separator membranes which have low electrolytic resistance.

It is a further object to provide an improved redox-type electrochemical cell incorporating a membrane which exhibits a high selectivity against positive ion migration during operation of a cell and particularly which exhibits selectivity against ferric ion migration during operation of an iron $(+3)$/iron $(+2)$ redox cell.

It is a further object of this invention to provide an improved redox-type electrochemical cell incorporating a membrane which exhibits long-term stability in acidic electrolytes.

It is a further object of this invention to provide an improved redox-type electrochemical cell incorporating a membrane which resists fouling during operation.

It is a further object of this invention to provide an improved redox-type electrochemical cell incorporating a membrane which exhibits minimal transport of bulk fluids.

Still other objects and advantages of the present invention will be obvious and apparent to those skilled in the art from the specification and the appended claims.

BRIEF DESCRIPTION OF THE DRAWINGS

FIG. 3 is a graph representing the diffusion profile of iron $(+3)$ ion across various membranes of this invention.

FIG. 4 is a graph representing the rate of iron $(+3)$ ion diffusion as a function of the area resistance of one of the membranes of the present invention.

FIG. 5 is a charge discharge curve of an iron $(+3)$/iron$(+2)$ redox cell in which the membranes of this invention are used.

BRIEF DESCRIPTION OF THE INVENTION

This invention relates to an improved redox-type cell incorporating separator membranes comprising a polyolefin base film grafted with a vinyl-substituted monomer via gamma irradiation. The vinyl-substituted monomers useful in this invention may be any of those traditionally used to make separator membranes for electrochemical cells. Such monomers as 2- and 4-vinylbenzyl chloride, 2- and 4-vinylpyridine, acrylic and methacrylic acid are commonly employed in the radiation grafting process. A preferred monomer is 4-vinylpyridine. The monomers are dissolved in solvents or solvent mixtures such as benzene, toluene, methylene chloride or trichloroethylene. A preferred solvent is methylene chloride, due to its low toxicity and low flammability. The redox system preferably involves circulating electrolyte pairs of the iron $(+3)$/iron$(+2)$, zinc$(+2$-

)/iron(+2), chromium (+3)/iron(+3), titanium(+3-)/iron(+2), titanium(+3)/bromine(−1) or zinc(+2)/bromine(−1) type. The separator membrane is preferably a polyolefin selected from the group comprising polypropylene, high density polethylene or low density polyethylene. The thickness of the membrane may be from about 1.0–6.0 mils, preferably about 3.0 mil.

DETAILED DESCRIPTION OF THE INVENTION

This invention relates to improved redox cells incorporating radiation grafted separator membranes.

Figure 1:
FIG. 1 summarizes the grafting process for the membrane of the present invention.
Figure 1:
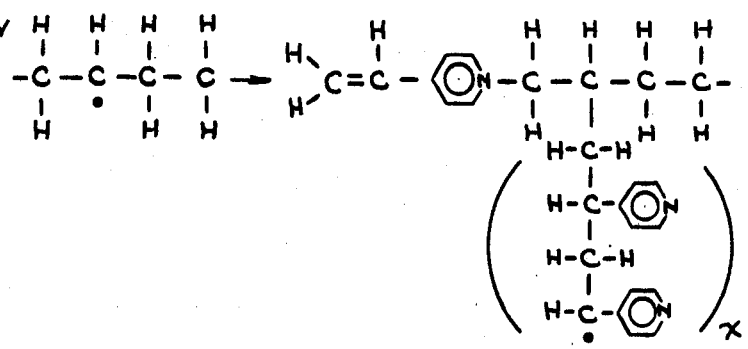
Figure 1:

The membranes of this invention are made from a 1.0–6.0 mil polyolefin base film which is grafted with a vinyl-substituted monomer via gamma radiation from a Cobalt-60 source. Suitable polyolefin films include polypropylene, high density polyethylene and low density polyethylene. Preferred 3.0 mil polyolefin films include the low density polyethylene film extruded from Bakelite B0602 (Union Carbide), the high density polyethylene film from Alathon 2074 (DuPont) and the polypropylene film from Olefane AT-36 (Crown Zellerbach). Suitable vinyl-substituted monomers include 4-vinylpyridine, 2-vinylpyridine, 2-vinylbenzylchloride, 4-vinylbenzylchloride, acrylic acid and methacrylic acid. Radiation grafting of vinyl pyridine monomers to polyolefin films to provide membranes useful in fuel cells is disclosed in U.S. Pat. No. 4,230,549, and to provide membranes useful in alkaline secondary cells in V. D'Agostino and J. Y. Lee, U.S. patent application Ser. No. 182,135 (filed Aug. 28, 1980), now U.S. Pat. No. 4,339,473. In preparing a typical embodiment of the present invention, the polyolefin base film is wound with an interlayer of absorbent paper into a bulk roll which is then introduced into a stainless steel reactor vessel. A solution of the monomer in an appropriate solvent such as methylene chloride is then transferred into the reactor and the bulk roll allowed to soak for 24 hours, after which the system is evacuated to remove oxygen. The bulk roll is exposed to gamma radiation from a Cobalt-60 source to a predetermined total dose. The bulk roll is then washed successively with 1% aqueous sulfuric acid, 2% aqueous sulfuric acid, and water. The chemical reactions occuring in the grafting process which lead to a 4-vinylpyridine polyolefin membrane are shown in FIG. 1.

When gamma radiation hits the polyolefin membrane, a free radical site is formed, which in the presence of 4-vinylpyridine, starts the graft polymerization. The properties of the ion exchange membrane are directly related to the percent graft. In general, the useful range of the percent graft is within the range of about 5 percent to 200 percent, and preferably about 30 percent to 100%, for example, a polypropylene grafted 4-vinylpyridine wherein the percent graft is 10 percent to 96 percent. Percent graft is defined as the weight increase due to grafting divided by the initial weight of the polyolefin film multiplied by 100. Table I demonstrates the percent grafts obtained for fifteen radiation grafted membranes produced by varying the 4-vinylpyridine concentration for any given polyolefin film while using a constant dose of Co-60 radiation.

TABLE I

RADIATION GRAFTED MEMBRANES

| Base Film | Monomer Concentration (% wt. in methylene chloride) | Dose Rate | Total Dose | Percent Graft |
|---|---|---|---|---|
| Polypropylene(PP) | 15 | 6889 rad/hr | 0.5 Mrad | 33 |
| Polypropylene(PP) | 20 | 6889 rad/hr | 0.5 Mrad | 49 |
| Polypropylene(PP) | 25 | 6889 rad/hr | 0.5 Mrad | 56 |
| Polypropylene(PP) | 30 | 6889 rad/hr | 0.5 Mrad | 99 |
| Polypropylene(PP) | 35 | 6889 rad/hr | 0.5 Mrad | 96 |
| High Density Polyethylene(HDPE) | 15 | 6889 rad/hr | 0.5 Mrad | 29 |
| High Density Polyethylene(HDPE) | 20 | 6889 rad/hr | 0.5 Mrad | 41 |
| High Density Polyethylene(HDPE) | 25 | 6889 rad/hr | 0.5 Mrad | 60 |
| High Density Polyethylene(HDPE) | 30 | 6889 rad/hr | 0.5 Mrad | 97 |
| High Density Polyethylene(HDPE) | 35 | 6889 rad/hr | 0.5 Mrad | 146 |
| Low Density Polyethylene(LDPE) | 15 | 6889 rad/hr | 0.5 Mrad | 28 |
| Low Density Polyethylene(LDPE) | 20 | 6889 rad/hr | 0.5 Mrad | 44 |
| Low Density Polyethylene(LDPE) | 25 | 6889 rad/hr | 0.5 Mrad | 66 |
| Low Density Polyethylene(LDPE) | 30 | 6889 rad/hr | 0.5 Mrad | 97 |
| Low Density Polyethylene(LDPE) | 35 | 6889 rad/hr | 0.5 Mrad | 114 |

The grafted membranes, containing the pyridine functional groups, behave as weak anionic exchangers in the acidic electrolyte of the battery, allowing ions such as $Cl^-$ and $SO_4^=$ ions to pass through, but not $Fe^{+3}$ ions. The grafted membranes are characterized by: (1) electrolytic resistance in various electrolytes; (2) rate of ferric ion diffusion; (3) chemical stability in electrolyte; (4) long-term electrolytic resistance in ferric chloride; and, (5) cycle life testing.

Figure 2:
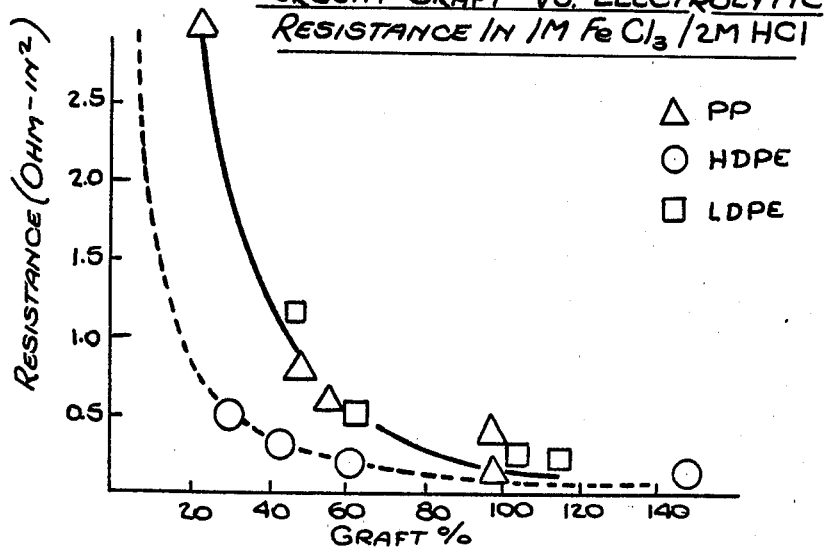
FIG. 2 is a graph of the percent graft versus electrolytic resistance in 1 M $FeCl_3$/2 M HCl.

The electrolytic resistance is an important indicator of the performance of the separator in working cells since it is directly related to the voltage loss in the cell. The electrolytic resistance of the grafted separator in turn is determined by the percent graft. FIG. 2 illustrates the relationship between resistance and percent graft in the series of separator membranes of Table I. At low percent graft, the resistance is very high and decreases rapidly as the percent graft increases. The resistance then levels off at a certain percent, which we label as "the levelling percent graft". Further increase in percent graft beyond this point results in very little decrease in the resistance of the separator.

The electrolytic resistance of the separator membranes of Table I was measured in two electrolytes, namely in 12 Be°/$H_2SO_4$ and in 2 M HCl/1 M $FeCl_3$. The results are outlined in Table II. Preferably the electrolytic resistance is within the range of 0.1 ohm-in$^2$ to 2 ohm-in$^2$ in 12°Be/$H_2SO_4$. The resistance will vary in different electrolytes.

TABLE II

ELECTROLYTIC RESISTANCE OF MEMBRANES AT 25° C.

| Film Type | % Graft of 4-Vinylpyridine | 1M $FeCl_3$ 2M HCl | 12Be/$H_2SO_4$ |
|---|---|---|---|
| PP | 33% | 3.00 ohm-in$^2$ | 1.10 ohm-in$^2$ |
| " | 49 | 0.80 0.41 | |
| " | 56 | 0.60 0.36 | |
| " | 99 | 0.06 0.06 | |
| " | 96 | 0.50 6.00 | |
| HDPE | 29 | 0.50 0.89 | |
| " | 41 | 0.40 0.32 | |
| " | 60 | 0.15 0.21 | |
| " | 97 | 0.08 0.08 | |
| " | 146 | 0.40 0.14 | |
| LDPE | 29 | 18.00 7.70 | |
| " | 44 | 1.10 0.30 | |
| " | 66 | 0.50 0.23 | |
| " | 97 | 0.06 0.05 | |
| " | 114 | 0.08 0.07 | |

In the iron redox system, it is imperative to have as little ferric ion diffusing across the separator from the posilyte to the negalyte as possible, to minimize capacity loss. The ferric ion diffusion was tested in a batch dialyzer.

FIG. 3 is a plot of ferric ion concentration in the ferric lean side, caused by ferric ion diffusion into the ferric lean side from the ferric rich side as a function of time for three membranes of Table II. From the slope of the plot, the flux or the rate of ferric ion diffusion can be calculated by Fick's First Law. Depending on the electrolytic resistances and the nature of the base polyolefin films, the amount of ferric ion flux can be varied over several orders of magnitude, as in FIG. 4. FIG. 4 is a plot of the ferric ion diffusion rate versus the electrolytic resistance for the series of HDPE membranes of Table I. Such a plot allows prediction of the resistance of any given separator membrane once its rate of ferric ion diffusion has been determined.

Within the resistance range studied, the logaritium of the flux is approximately linear with the separators' electrolytic resistances. Thus by selecting a membrane of appropriate resistance, the selectivity against ferric ion diffusion is also set. The highest resistance separator exhibits the best selectivity against ferric ion diffusion. However, too high an electrolytic resistance is unacceptable because it gives too large an IR drop across the separator. These are the trade-offs to be considered.

Not only must the separator be compatible in the electrolyte, but it must be stable to provide years of cycle life. Any degradation will affect the cell performance adversely. The chemical stability of a separator was evaluated in 2 M HCL at 50° C. for one week by following any change in its electrolytic resistance. The results are depicted in Table III. No increase in the separators' electrolytic resistance is observed. If any of the ion exchange groups were lost, a definite increase in electrolytic resistance would be noted. The decrease resistance observed is due to the gradual conversion of the grafted monomer to the desirable ion-conductive form. The present data indicates that the separators are stable in the electrolyte, even at elevated temperatures.

TABLE III

CHEMICAL STABILITY OF MEMBRANES AFTER SOAKING IN 2M HCl at 50° C.

| Film Type | % Graft of 4-Vinylpyridine | 3 hrs. | 26 hrs. | 95 hrs. | 119 hrs. | |
|---|---|---|---|---|---|---|
| PP | 33% | 1.1 ohm-in$^2$ | 0.85 | 0.76 | 0.68 | 0.70 ohm-in$^2$ |
| " | 49 | 0.16 | 0.12 | 0.12 | 0.13 | 0.13 |
| " | 56 | 0.11 | 0.10 | 0.08 | 0.09 | 0.09 |
| " | 99 | 0.04 | 0.04 | 0.03 | 0.03 | 0.05 |
| " | 96 | 0.11 | 0.08 | 0.07 | 0.07 | 0.08 |
| HDPE | 29 | 0.42 | 0.37 | 0.36 | 0.36 | 0.36 |
| " | 41 | 0.07 | 0.07 | 0.06 | 0.06 | 0.08 |
| " | 60 | 0.08 | 0.07 | 0.06 | 0.07 | 0.08 |
| " | 97 | 0.03 | 0.03 | 0.02 | 0.02 | 0.04 |
| " | 146 | 0.04 | 0.03 | 0.03 | 0.03 | 0.04 |
| LDPE | 28 | 1.18 | 1.04 | 1.01 | 1.02 | 1.05 |
| " | 44 | 0.25 | 0.21 | 0.20 | 0.21 | 0.22 |
| " | 66 | 0.10 | 0.09 | 0.08 | 0.09 | 0.09 |
| " | 97 | 0.06 | 0.05 | 0.04 | 0.05 | 0.06 |
| " | 114 | 0.11 | 0.09 | 0.08 | 0.08 | 0.09 |

Membrane fouling is a more serious problem with anionic exchange membranes than with cationic exchange membranes. Since the membrane of the present invention is an anionic exchange membrane, fouling can be a problem. Generally, when fouling occurs in the anionic separator, there is an abrupt increase in the separator's electrolytic resistance, which then gives rise to a large voltage loss in the battery. Studies have shown that fouling of separators is caused by ferric ions which form a negatively charged complex. See, *NASA-Redox Storage System Project, Industrial Briefing* July 8-9, 1980, Redox Project Office, NASA Lewis Research Center, Cleveland, Ohio. The electrolytic resistances of the membranes were measured after soaking in the 1 M $FeCl_3$/2 M HCl solution for a long period, as shown in Table IV. There is no significant increase in electrolytic resistance after more than one month of soaking in ferric chloride solution at room temperature. This result, plus that from cycle life testing, supports the conclusion that there is no membrane fouling in the membranes.

TABLE IV

FOULING BEHAVIOR OF MEMBRANES AFTER LONG TERM SOAKING IN 1M FeCl₃2M HCl ELECTROLYTE AT ROOM TEMPERATURE

| FILM TYPE | % Graft of 4-Vinylpyridine | Ohr | | 2 DAY | 4 DAY | 8 DAY | 1 MONTH |
|---|---|---|---|---|---|---|---|
| PP | 33 | 3 | ohm/in² | 3.0 | 3.0 | 2.6 | 3.3 |
| " | 49 | 0.80 | | 0.80 | 0.80 | 0.70 | 0.70 |
| " | 56 | 0.60 | | 0.60 | 0.60 | 0.60 | 0.60 |
| " | 99 | 0.06 | | 0.18 | 0.10 | 0.10 | 0.10 |
| " | 96 | 0.50 | | 0.45 | 0.50 | 0.43 | 0.46 |
| HDPE | 29 | 0.50 | | 0.60 | 0.70 | 0.60 | 0.70 |
| " | 41 | 0.40 | | 0.42 | 0.44 | 0.50 | 0.44 |
| " | 60 | 0.15 | | 0.21 | 0.21 | 0.23 | 0.22 |
| " | 97 | 0.08 | | 0.08 | 0.15 | 0.08 | 0.13 |
| " | 146 | 0.40 | | 0.14 | 0.20 | 0.29 | 0.21 |
| LDPE | 28 | 18.0 | | 18.0 | 17.2 | 18.5 | 18.4 |
| " | 44 | 1.1 | | 1.0 | 1.1 | 1.0 | 1.0 |
| " | 66 | 0.50 | | 0.53 | 0.50 | 0.60 | 0.55 |
| " | 97 | 0.06 | | 0.05 | 0.04 | 0.06 | 0.05 |
| " | 114 | 0.08 | | 0.08 | 0.09 | 0.09 | 0.08 |

Cycle testing was done with 60-in² single cell employing the HDPE membrane series of Table II as shown in FIG. 5. More than 100 charge-discharge cycles over a period of 6 months were obtained with no significant degradation in cell performance. The cell parameters are given in Table V.

TABLE V

CELL PARAMETERS IN CYCLE LIFE TESTING

| | |
|---|---|
| Cell Type: | Single cell, encapsulated |
| Active cell area: | 60-in² |
| Electrodes: | Carbon electrodes fabricated at GEL by "Wil-Mat" method. |
| Electrolyte: | 3 Molar FeCl₂ |
| Posilyte Volume: | 1 liter |
| Negalyte Volume: | 500 ml |
| Electrode Spacing | 0.30 inches |
| Charging Mode: | Constant current from 3 to 10 amperes to a cut off of 1.8 volt |
| Discharge Mode: | Constant current from 2 to 8 amperes to a cut off of 0.80 volt |

An example of a charge and discharge curve for the series of HDPE membranes of Table II is shown in FIG. 5, in which a coulombic efficiency, defined as ampere-hour input over amper-hour output, of 91% was obtained. Cycles usually show a coulombic efficiency of a least 85% and upward. This is contrasted to the coulombic efficiency of about 60 to 75% using a microporous separator. (See, U.S. Pat. No. 4,069,371, Ex. 4) Results of this cycle testing can be briefly summarized as follows: (1) coulombic efficiencies are in the range of 85% minimally to over 95% under controlled conditions; (2) polarization voltage losses are in the order of 7%, or less than 10% of the total charging potential; (3) membrane properties are such that maximum volume changes during cycling are within 10% of total electrolyte volume. Even though the negalyte volumes decrease during charging, they always return to essentially the original value during discharge; (4) transport numbers of ions through the membrane depend upon pH, solution concentration and probably current densitites. The membranes of the present invention are anionic, but the transport number $t^-$ is not unity, nor is $t^+$ zero; (5) no bulk fluid transfer was observed; and, (6) no mechanical problems were encountered in handling or during operation.

Radiation grafting is a valuable process to make ion exchange membranes. By optimizing the grafting parameters and the related properties of electrolytic resistance and ferric ion flux, a separator for the redox battery can be "tailor-made". Such a separator is low cost and can be mass-produced in a continuous or batch process.

What is claimed is:

1. In an improved redox electrochemical cell incorporating two chemically-inert electrodes of opposite polarity, at least one aqueous acidic electrolyte, and a separator membrane between the adjacent electrodes, the improvement comprising a separator membrane formed from a polyolefin film grafted with a vinyl-substituted monomer via gamma irradiation.

2. The redox cell of claim 1 in which the polyolefin film is selected from the group comprising polypropylene, high density polyethylene, low density polyethylene, a perfluorinated polyolefin or a partially fluorinated polyolefin.

3. The redox cell of claim 1 which the vinyl-substituted monomer is 4-vinylpyridine.

4. The redox cell of claim 1 in which the vinyl-substituted monomer is 2-vinylpyridine.

5. The redox cell of claim 1 in which the vinyl-substituted monomer is 2-vinylbenzyl chloride.

6. The redox cell of claim 1 in which the vinyl-substituted monomer is 4-vinylbenzyl chloride.

7. The redox cell of claim 1 in which the vinyl-substituted monomer is methacrylic acid.

8. The redox cell of claim 1 which the vinyl-substituted monomer is acrylic acid.

9. The redox cell of claim 1 in which the separator membrane is formed by grafting polypropylene with 4-vinylpyridine to 10-100% of the membrane weight.

10. The redox cell of claim 1 in which the separator membrane is formed by grafting high density polyethylene with 4-vinylpyridine to 29-146% of the membrane weight.

11. The redox cell of claim 1 in which the separator membrane is formed by grafting low density polyethylene to 4-vinylpyridine to 28-114% of the membrane weight.

* * * * *